United States Patent [19]

Dhyanchand

[11] Patent Number: 4,939,441
[45] Date of Patent: Jul. 3, 1990

[54] EXCITATION SYSTEM FOR A BRUSHLESS GENERATOR HAVING SEPARATE AC AND DC EXCITER FIELD WINDINGS

[75] Inventor: P. John Dhyanchand, Rockford, Ill.

[73] Assignee: Sundstrand Corporation, Rockford, Ill.

[21] Appl. No.: 427,821

[22] Filed: Oct. 27, 1989

[51] Int. Cl.⁵ .................. F02N 11/04; H02P 9/36
[52] U.S. Cl. ..................... 318/718; 318/158; 318/711; 318/719; 290/46
[58] Field of Search ............ 318/140, 151, 152, 153, 318/154, 158, 705, 711, 712, 718, 719, 724; 310/112, 113, 180, 181, 184, 198, 199; 290/31, 38 R, 39, 46, 49; 322/29, 40, 47, 61

[56] References Cited

U.S. PATENT DOCUMENTS

| | | | |
|---|---|---|---|
| 3,034,035 | 5/1962 | Baumann et al. | 310/113 X |
| 3,379,947 | 4/1968 | Lalonde | 318/823 X |
| 3,809,914 | 5/1974 | Kilgore et al. | |
| 3,908,161 | 9/1975 | Messenger | |
| 4,093,869 | 6/1978 | Hoffmann et al. | 290/31 |
| 4,219,739 | 8/1980 | Greenwell | 310/113 X |
| 4,305,001 | 12/1981 | Vamaraju et al. | 322/61 X |
| 4,467,267 | 8/1984 | Hucker et al. | 322/61 |
| 4,743,777 | 5/1988 | Shilling et al. | 322/61 X |

OTHER PUBLICATIONS

Dhyanchand, co-pending application Ser. No. 07/408,928, filed Sep. 18, 1989, entitled "Brushless Generator Having a Three-Phase Combined AC/DC Exciter Field Winding".

Primary Examiner—Bentsu Ro
Attorney, Agent, or Firm—Marshall, O'Toole, Gerstein, Murray & Bicknell

[57] ABSTRACT

An excitation system for a brushless generator includes an exciter portion having a set of polyphase exciter field windings and an additional exciter field winding disposed in a stator of the generator, a source of polyphase, constant-frequency AC power and circuitry coupled to the set of polyphase field winding for connecting the source of polyphase, constant-frequency AC power thereto at a beginning of operation in a starting mode whereby AC power is induced in an exciter portion armature winding by transformer action. AC power is further provided to armature windings of a main generator portion to thereby cause a rotor of the generator to accelerate. An autotransformer is provided to reduce the voltage provided by the source of polyphase AC power prior to application of such power to the polyphase field windings so that the need for an auxiliary inverter is obviated. Thereafter, at least one of the windings of the set of polyphase windings is connected in series with the additional field winding when the speed of the rotor reaches a predetermined speed and a DC current of controlled magnitude is delivered to the series-connected exciter field windings to thereafter allow operation in a generating mode.

10 Claims, 3 Drawing Sheets

EXCITATION SYSTEM FOR A BRUSHLESS GENERATOR HAVING SEPARATE AC AND DC EXCITER FIELD WINDINGS

TECHNICAL FIELD

The present invention relates generally to brushless generators, and more particularly to brushless generators which may be used in a generating mode to convert mechanical power into electrical power or in a starting mode to convert electrical power into motive power for starting a prime mover.

BACKGROUND ART

In a variable speed, constant frequency (VSCF) power generating system, a brushless, synchronous generator is supplied variable speed motive power by a prime mover and develops variable frequency AC power at an output thereof. The variable frequency power is rectified and provided over a DC link to a controllable static inverter. The inverter is operated to produce constant frequency AC power, which is then supplied over a load bus to one or more loads.

As is known, a generator of a VSCF system can be operated as a motor in a starting mode to convert electrical power supplied by an external AC power source into motive power which may in turn be provided to the prime mover to bring it up to self-sustaining speed. In the case of a brushless, synchronous generator having a permanent magnet generator (PMG), an exciter portion and a main generator portion mounted on a common shaft, it is necessary to provide power at a controlled voltage and frequency to the armature windings of the main generator portion and to provide field current to the main generator portion via the exciter portion so that the motive power may be developed.

In known systems, field current for the main generator portion is developed at a beginning of operation in a starting mode by providing AC power at a controlled frequency and voltage to a set of exciter field windings. AC power is developed in armature windings of the exciter by transformer action and such power is rectified by a rotating rectifier and provided to the field winding of the main generator portion. In order to prevent saturation of the exciter armature windings, it is necessary to provide the AC power to the exciter field windings at a certain volts-per-hertz ratio. In addition, in order to operate the generator as a motor at unity power factor, it is necessary to provide a certain voltage to the exciter field windings for a given armature current. In the case of a brushless generator which is designed to produce 400 hz., 115 volt power, it is necessary to provide 90 volts to the exciter field windings during operation in the starting mode. This voltage, in turn, must be provided at 1200 hz. to prevent saturation of the exciter armature windings. Since starting is usually accomplished using 400 hz., 115 volt AC power supplied by a ground cart or other external AC source, it has been found necessary to use an auxiliary inverter to convert such power into the required 1200 hz., 90 volt power for starting. In some applications, the use of an auxiliary inverter may be considered undesirable.

Shilling, et al., U.S. Pat. No. 4,743,777 discloses a starter generator system using a brushless, synchronous generator. The system is operable in a starting mode to produce motive power from electrical power provided by an external AC power source. An exciter of the generator includes separate DC and three-phase AC field windings disposed in a stator. When operating in a starting mode at the beginning of a starting sequence, the AC power developed by the external AC power source is directly applied to the three-phase AC exciter field windings. The AC power developed by the external AC source is further provided to a variable voltage, variable frequency power converter which in turn provides a controlled voltage and frequency to armature windings of a main generator. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power.

When the generator is operated in a generating mode, switches are operated to disconnect the AC exciter field windings from the external AC source and to provide DC power to the DC exciter field winding.

Messenger, U.S. Pat. No. 3,908,161 discloses a brushless generator including three exciter field windings which are connected in a wye configuration and provided three-phase AC power during operation in a starting mode. The three-phase AC power induces AC power in an exciter armature winding which is rectified and applied to a main generator field winding. Main armature windings receive controlled AC power to in turn cause rotation of the generator rotor. Thereafter, the three exciter field windings are connected in series and provided DC excitation when operating in a generating mode.

Kilgore, et al. U.S. Pat. No. 3,809,914 discloses a starting system for a prime mover. An exciter of a slip ring generator driven by the prime mover is operated as a slip ring induction motor in response to the application of external AC power thereto. Specifically, the generator includes a three-phase exciter field winding which is provided AC power during starting. Also during starting, a control is connected through slip rings to a three-phase exciter armature winding which is disposed on a rotor of the generator. The current flowing in the exciter armature winding is controlled to cause the exciter to develop motive power which is transferred to the prime mover to bring it up to self-sustaining speed.

SUMMARY OF THE INVENTION

In accordance with the present invention, a brushless generator is provided with an excitation system which in turn permits the generator to be operated in a starting mode of operation using a commonly available source of power without requiring the use of an auxiliary inverter or modification of the exciter windings.

More particularly, an excitation system for a brushless generator includes an exciter portion having a set of polyphase field windings and an additional field winding, all of which are disposed in a stator of the generator, the exciter portion further having an armature winding disposed on the rotor. At a beginning of operation of the generator in a starting mode, a source of polyphase, constant-frequency AC power is coupled to the polyphase field windings so that AC power is induced in the exciter portion armature winding by transformer action. The induced AC power is rectified by a rotating rectifier and is delivered to a main generator portion field winding. AC power at a controlled voltage and frequency is provided to a set of main generator portion armature windings to in turn cause the rotor to be accelerated. When the speed of the rotor reaches a predetermined speed, at least one of the windings of the set of polyphase windings is connected in series with the additional field winding and a DC current of controlled magnitude is delivered to the series-connected exciter field windings so that operation in a generating mode may thereafter commence.

Preferably, the AC source develops power at a frequency equal to the frequency of the power developed by the generator when operating in the generating mode and the frequency of such power is not modified prior to application of such power to the set of exciter field windings. In order that the windings of a standard generator need not be redesigned to accomplish the starting function, means are provided for reducing the voltage of the power supplied by the AC source prior to application of such power to the exciter field windings. Also, the current delivered to the main generator portion armature windings is controlled so that the generator operates as an underexcited motor to develop the required starting motive power.

As should be evident from the foregoing, the excitation system of the present invention does not require an auxiliary inverter, nor does it require redesign of the exciter windings.

DESCRIPTION OF THE PREFERRED EMBODIMENT

Figure 1:
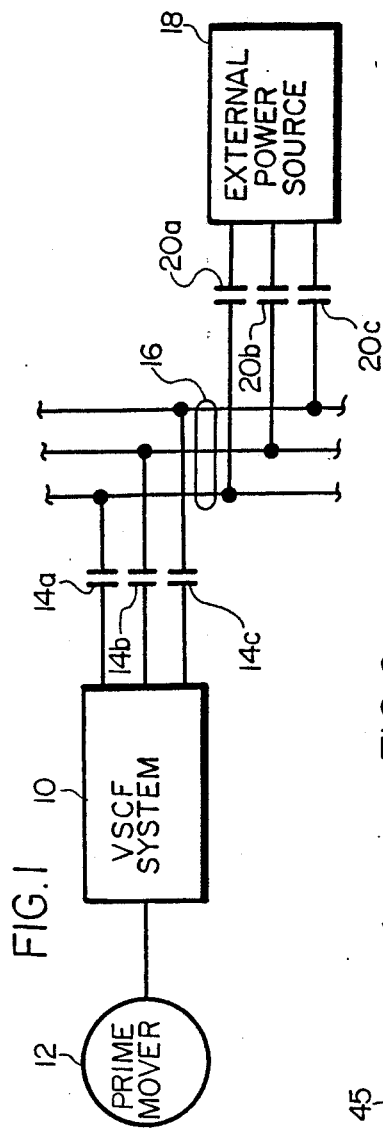
FIG. 1 is a block diagram of a power generating system.

Referring now to FIG. 1, a variable speed, constant frequency (VSCF) system 10 operates in a generating mode to convert variable speed motive power produced by a prime mover 12, such as an aircraft jet engine, into constant frequency AC electrical power which is delivered through controllable contactors 14a,14b,14c to a load bus 16. The VSCF system 10 is also operable in a starting mode using electrical power provided by an external power source 18, such as a ground power cart, which is in turn coupled to the load bus 16 through controllable contactors 20a–20c. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Typically, the voltage and frequency of the power produced by the external power source 18 is the same as the voltage and frequency of the power produced by the system 10 during operation in the generating mode. In the preferred embodiment, the system 10 and power source 18 develop three-phase 400 hz. power at 115 volts.

Figure 2:
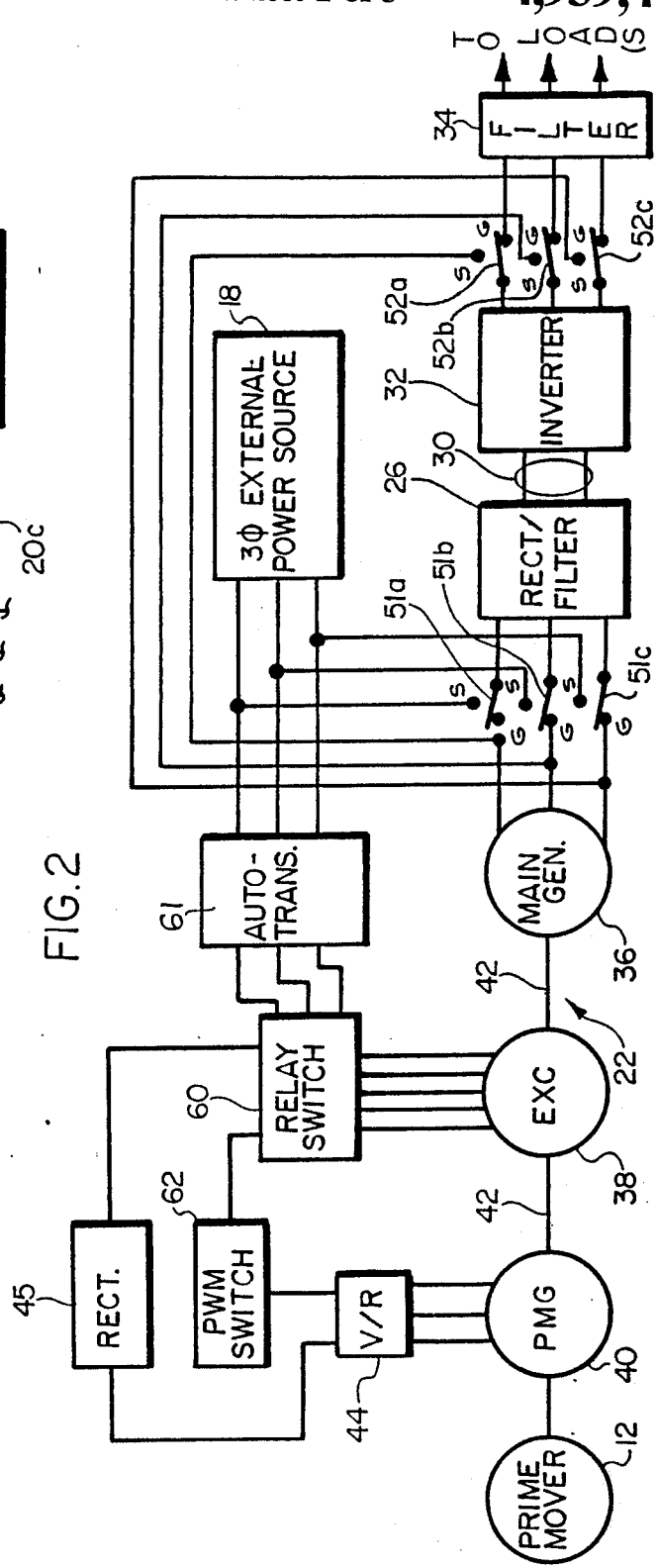
FIG. 2 comprises a combined mechanical and electrical block diagram of the power generating system shown in FIG. 1.

Referring now to FIG. 2, the VSCF system 10 includes a brushless, synchronous generator 22 driven by the prime mover 12. During operation in the generating mode, the generator 22 develops polyphase, variable frequency AC power which is converted into DC power by a rectifier/filter 26. The resulting DC power is provided over a DC link 30 to a polyphase inverter 32 which converts the DC power into three-phase, constant-frequency AC power. This AC power may be filtered by an optional filter 34 and is provided via the set of controllable contactors 14a–14c to the load bus 16.

Figure 3A:
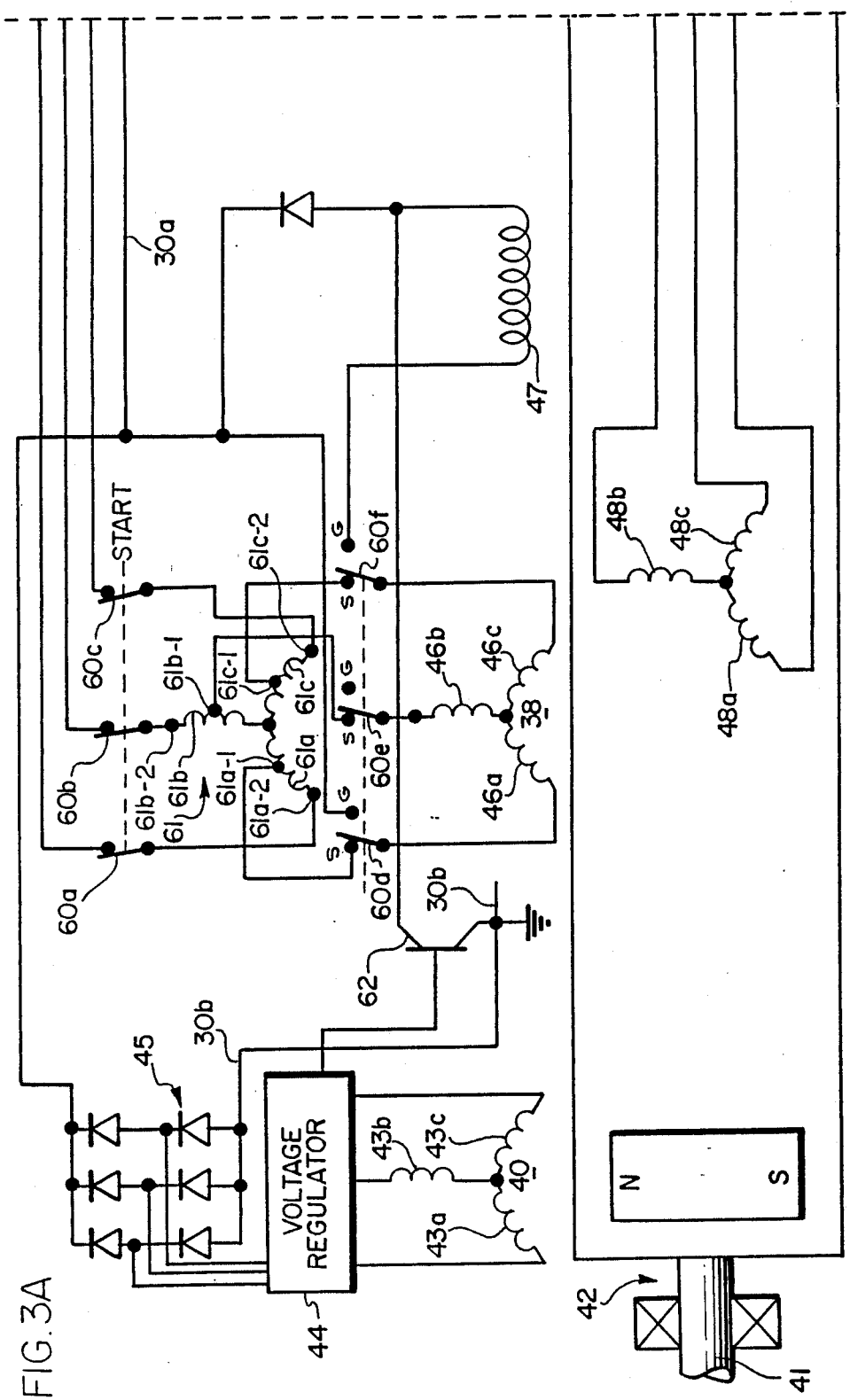
FIGS. 3A and 3B, when joined along the dashed lines, together comprise a combined mechanical block diagram and electrical schematic diagram of the brushless generator, rectifier and inverter of FIG. 2 together with associated components illustrating the excitation system of the present invention.
Figure 3B:
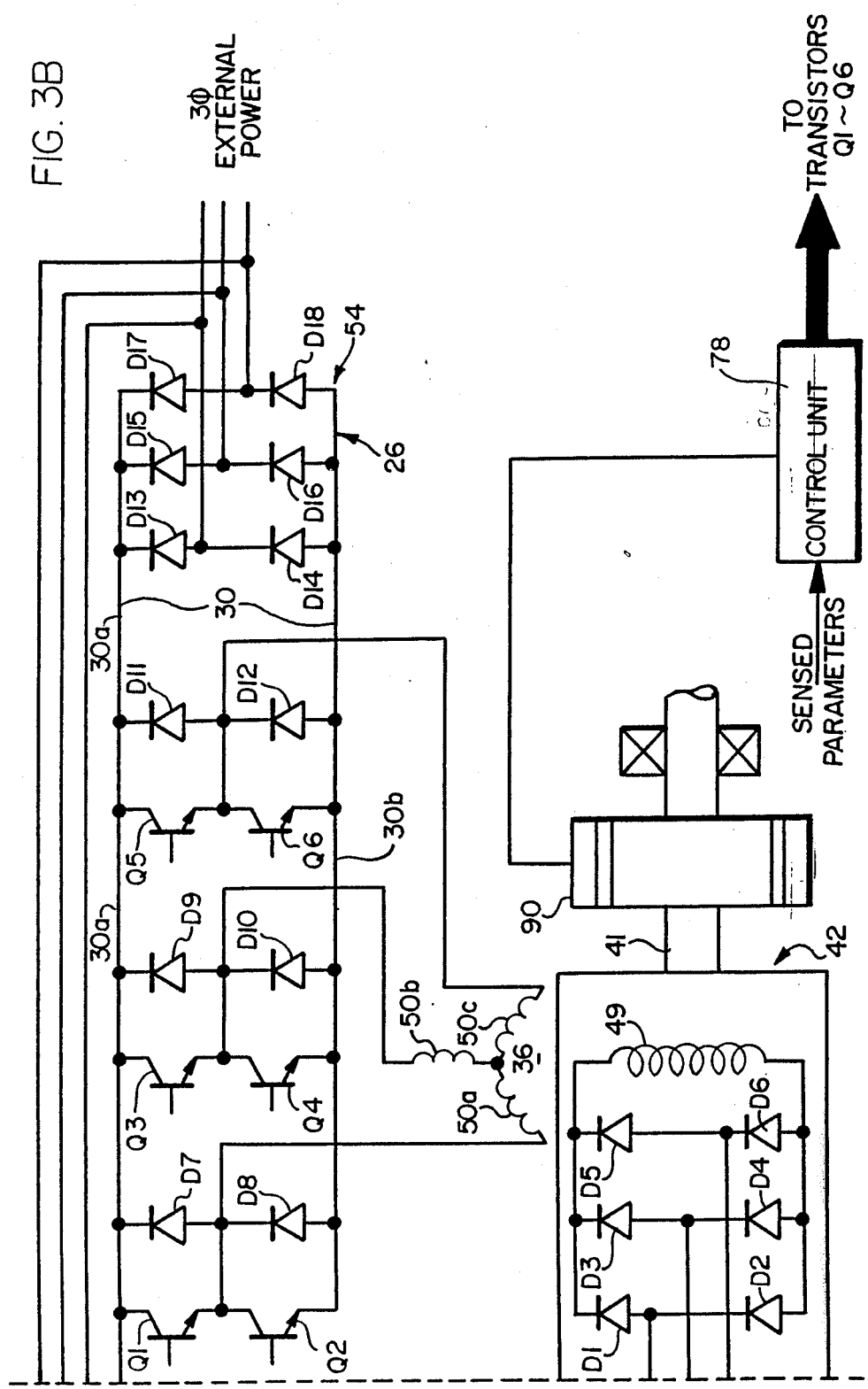

Referring also to FIGS. 3A and 3B, the generator 22 includes a main generator portion 36, an exciter portion 38 and a permanent magnet generator (PMG) 40, all of which include rotor structures mounted on a common shaft 41 of a rotor 42. In the generating mode of operation, rotation of the common shaft 41 in turn causes polyphase power to be developed in armature windings 43a–43c of the PMG 40 which is in turn delivered to a voltage regulator 44. As noted in greater detail hereinafter, the voltage regulator 44 and a rectifier 45 deliver a controlled magnitude of DC current to two exciter field windings 46a–46c of a set of polyphase exciter field windings 46a–46c and an additional DC exciter field winding 47 connected in series therewith. This current induces an AC voltage in armature windings 48a–48c of the exciter 38 which is rectified by a rotating rectifier comprising diodes D1–D6. The resulting DC power is supplied to a field winding 49 of the main generator 36. Rotation of the common shaft 41 while the field current is flowing in the field winding 49 of the main generator portion 36 in turn causes polyphase voltages to be developed in armature windings 50a–50c of the main generator portion 36. As seen specifically in FIG. 2, these voltages are supplied through contactor sets represented by single-pole, two-throw switches 51a–51c to the rectifier 26. Also during operation in the generating mode, a set of contactors represented by single-pole, two-throw switches 52a–52c connect the output of the inverter 32 to the filter 34 so that the AC power is provided to the load bus 16. It should be noted that the contactors 14a–14c and 20a–20c are not shown in FIGS. 2 and 3 for clarity.

Also, it should be noted that the PMG armature windings 43a–43c, exciter field windings 46a–46c and 47 and main generator portion armature windings are disposed in a stator 54 of the generator 22.

During operation in the starting mode, the contactor sets represented by the switches 51a–51c and 52a–52c are moved to the positions opposite those shown in FIG. 2 so that the external AC power source 18 is coupled to the input of the rectifier 26 and the output of the inverter 32 is coupled to the armature windings 50a–50c of the main generator 36. In addition, the constant frequency output of the external power source 18 is provided by a relay switch 60 and an autotransformer 61 directly to the field windings 46a–46c of the exciter 38. Such application of power in turn causes the rotor structures, and hence the common shaft 41, to accelerate, in turn accelerating the prime mover 12. Once a particular speed of the shaft 41 is reached, the relay switch 60 is operated to connect the exciter field windings 46a, 46c and 47 in series with one another in a DC configuration and a pulse width modulated (PWM) switch 62 is operated so that the DC current of controlled magnitude is provided to the exciter field windings 46a, 46c and 47. The generating system 10 may thereafter be operated in the generating mode once the prime mover 12 reaches operating speed.

Referring now specifically to FIG. 3A, the relay switch includes contactor sets represented by switches 60a–60c and 60d–60f which are ganged together. During operation in the starting mode, the switches 60a–60f are in the positions shown in FIG. 3A. The autotransformer 61 includes three-phase windings 61a–61c, each of which includes an intermediate tap 61a-1–61c-1 and an end tap 61a-2–61c-2, respectively. The intermediate taps 61a-1–61c-1 are coupled to the polyphase field windings 46a–46c while the end taps 61a-2–61c-2 are coupled by the closed switches 60a–60c to the phases of the external power source 18. The autotransformer reduces the voltage developed by the source 18 to a level of, for example, 30 volts and such voltage is provided to the windings 46a–46c. The windings 46a–46c are connected in a wye configuration and serve as primary windings of a transformer having secondary windings comprising the exciter armature windings 48a–48c. At the beginning of a start sequence, at which time the speed of the rotor structures and common shaft 41 is zero, AC power is induced by transformer action in the windings 48a–48c. This AC power is rectified by the rotating rectifiers D1–D6 connected in a three-phase bridge configuration and the resulting DC power is provided to the field winding 49 of the main generator portion 36. At this time, a control unit 78 operates switches Q1–Q6 in the inverter 32 to convert the DC power provided by the rectifier 26 into AC power which is supplied to the armature windings 50a–50c of the main generator portion 36.

The control unit 78 is responsive to the output of a rotor position sensor in the form of a resolver 90 and is further responsive to one or more sensed parameters in the power delivered to the windings 50a–50c. In conventional fashion, the control unit 78 controls the voltage magnitude, phase and frequency of the power delivered to the windings 50a–50c to in turn accelerate the rotor 42 in a controlled fashion. Also, sufficient current is supplied to the armature windings 50a–50c to cause the generator to operate as an underexcited motor to provide motive power to the prime mover 12.

Once the speed of the shaft 41 reaches the certain speed, as detected by sensing the output of the resolver 90, the switches 60a–60c are opened and the switches 60d–60f are moved to the positions opposite those shown in FIG. 3A. This may be accomplished manually or the switching may be effected by the control unit 78, as desired. Movement of the switches 60d and 60f causes the windings 46a and 46c to be connected in series with one another and in series with the winding 47. In addition, the winding 46a is connected to receive DC power developed by the rectifier 45 and/or DC power provided on a DC link conductor 30a of the DC link 30.

Following such switching, a controlled magnitude of DC current is provided to the windings 46a, 46c and 47 through operation of the PWM switch 62 which, in the preferred embodiment, is operated by the voltage regulator 44 and comprises a bipolar transistor having a collector electrode coupled to the windings 46a, 46c and 47 and an emitter electrode coupled to ground potential. Thereafter, further acceleration of the shaft 41 may be accomplished by operating the inverter 32 to suitably energize the windings 50a–50c and operation in the generating mode may be commenced by moving the switches 51a–51c and 52a–52c to the positions shown in FIG. 2 when the prime mover 12 reaches its operating speed.

The design of the voltage regulator 44 is conventional in nature except that a pulse-width modulator which controls the switch 62 must be provided. This pulse-width modulator is itself conventional in nature and will not be described in detail herein.

Also, the design of the control unit 78 is straightforward and may be implemented in whole or in part by software or hardware.

The excitation system of the present invention does not require an auxiliary inverter to provide power at a frequency different than the frequency of the power provided by the external source 18. Further, the present invention does not require that the armature windings of the generator be redesigned, and hence a standard brushless generator may be used. Thus, the excitation system of the present invention results in increased reliability of the generator and VSCF system 10 as a whole.

I claim:

1. An excitation system for a brushless generator having a main generator portion including a field winding disposed on a rotor and which receives field current and an armature winding disposed in a stator wherein the rotor is movable with respect to the stator and the generator is operable in a generating mode to convert motive power into electrical power which is developed in the armature winding and in a starting mode to convert electrical power provided to the armature winding into motive power, comprising:
    an exciter portion having a set of polyphase field windings and an additional field winding, all of the exciter portion field windings being disposed in the stator, the exciter portion further having an armature winding disposed on the rotor and coupled to the main generator portion field winding;
    a source of polyphase, constant frequency AC power;
    means coupled to the set of polyphase field windings for connecting the source of polyphase, constant frequency AC power thereto at a beginning of operation in the starting mode wherein AC power is induced in the exciter portion armature winding by transformer action and wherein the rotor is accelerated during such time wherein such connecting means connects at least one of the windings of the set of polyphase field windings in series with the additional exciter field winding when the speed of the rotor reaches a predetermined speed; and
    means for delivering a DC current of controlled magnitude to the series-connected exciter field windings after the rotor reaches the predetermined speed.

2. The excitation system of claim 1, further including means coupled between the source of polyphase AC power and the set of polyphase field windings for reducing the voltage developed by the AC power source to prevent overexcitation of the main generator portion field winding.

3. The excitation system of claim 2, wherein the reducing means comprises an autotransformer.

4. The excitation system of claim 1, wherein the connecting means comprises a relay switch.

5. The excitation system of claim 1, wherein the source of polyphase AC power develops three phase voltages and the set of polyphase field windings includes three windings, the connecting means connecting two of the three polyphase field windings in series with the additional field winding.

6. An excitation system for a brushless generator having a main generator portion including a field winding disposed on a rotor and which receives field current and an armature winding disposed in a stator wherein the rotor is movable with respect to the stator and the generator is operable in a generating mode to convert motive power into electrical power which is developed in the armature winding and in a starting mode to convert electrical power provided to the armature winding into motive power, comprising:

an exciter portion having a set of polyphase field windings and an additional field winding, all of the exciter portion field windings being disposed in the stator, the exciter portion further having an armature winding disposed on the rotor and coupled to the main generator portion field winding;

a source of constant frequency AC power which develops polyphase voltages at a certain magnitude;

means coupled to the source of AC power for reducing the magnitude of the polyphase voltages;

means connecting the reducing means to the set of polyphase field windings to provide AC power thereto at a beginning of operation in the starting mode wherein AC power is induced in the exciter portion armature winding by transformer action and wherein the rotor is accelerated during such time wherein the connecting means disconnects the reducing means from the set of polyphase field windings and connects at least one of the windings of the set of polyphase field windings in series with the additional field winding when the speed of the rotor reaches a predetermined speed; and means for delivering a DC current of controlled magnitude to the series-connected exciter field windings after the rotor reaches the predetermined speed.

7. The excitation system of claim 6, wherein the reducing means comprises an autotransformer.

8. The excitation system of claim 6, wherein the set of polyphase field windings comprises three windings and the connecting means comprises a relay switch which connects two of the three windings in series with one another and with the additional field winding when the speed of the rotor reaches the predetermined speed.

9. An improvement in a brushless generator having a main generator portion including a field winding disposed on a rotor and an armature winding disposed in a stator wherein the rotor is movable with respect to the stator and further including an exciter portion having polyphase AC field windings and a DC field winding disposed in the stator and a set of exciter armature windings diposed on the rotor, the generator being operable in a generating mode to convert motive power into AC electrical power at a certain frequency and voltage which is developed in the main generator portion armature winding and in a starting mode to convert electrical power provided to the main generator portion armature winding into motive power, the exciter portion AC field windings receiving power developed by an AC power source at the certain frequency and voltage at a beginning of operation in the starting mode and thereafter the DC field winding receiving a controlled magnitude of DC current, the improvement comprising:

an autotransformer coupled between the AC power source and the AC field windings which reduces the voltage of the power developed by the AC power source before such power is applied to the AC field windings to prevent overexcitation of the main generator portion field windings.

10. The improvement of claim 9, wherein the AC power source and the autotransformer include three phases.

* * * * *